Feb. 10, 1931.  L. SCUSA  1,792,043
INDICATOR GAUGE
Filed Oct. 3, 1928  2 Sheets-Sheet 2
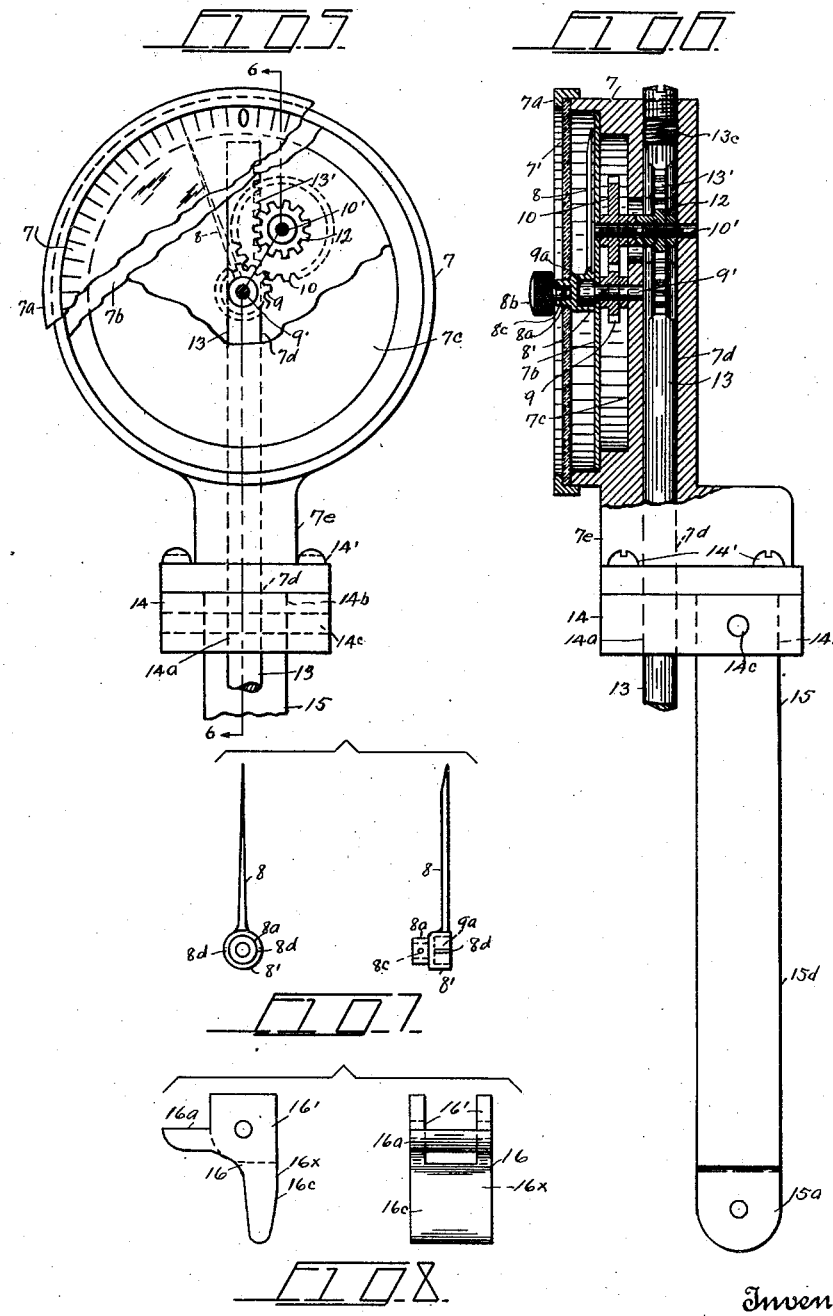

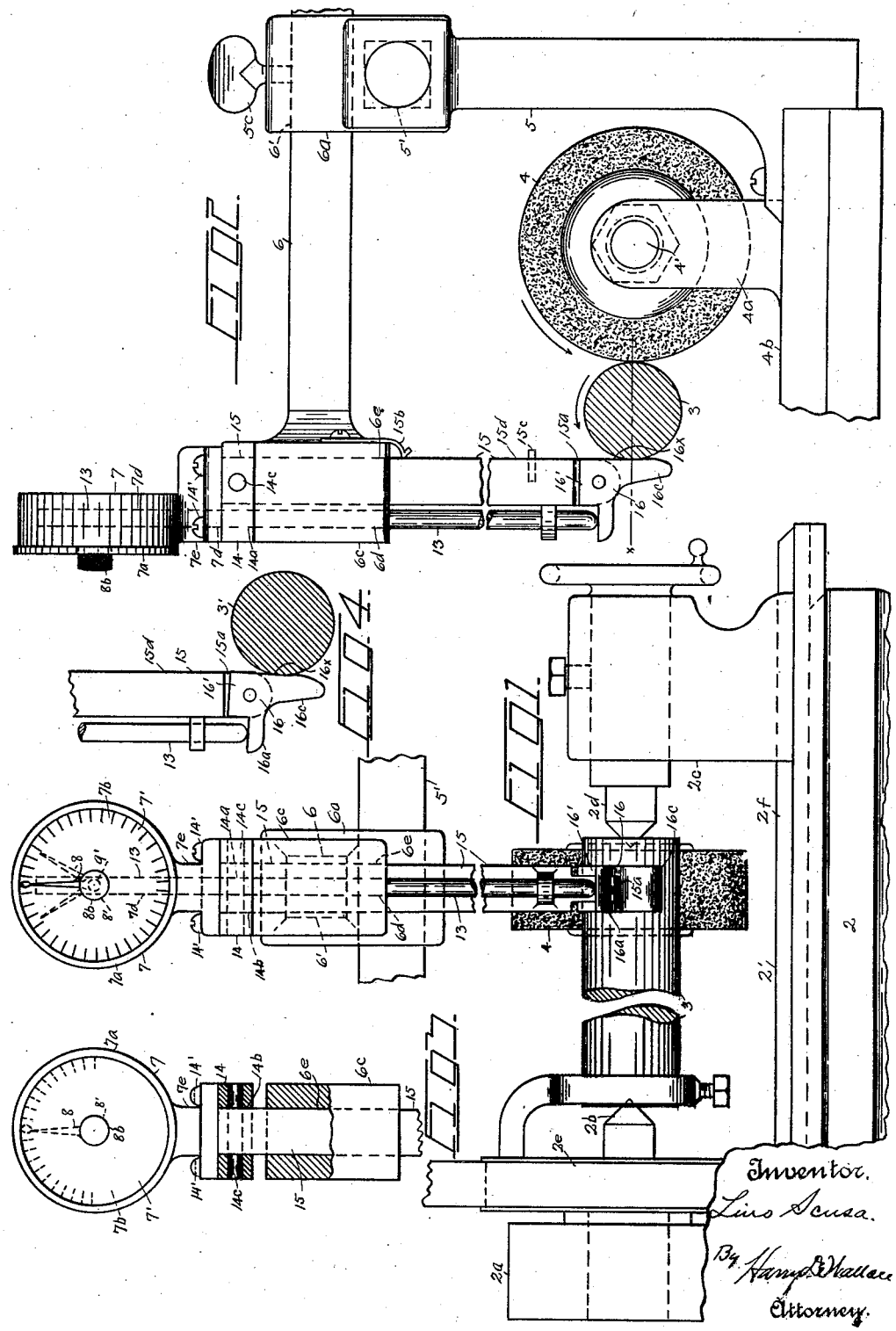

Patented Feb. 10, 1931

1,792,043

UNITED STATES PATENT OFFICE

LINO SCUSA, OF PHOENIX, NEW YORK

INDICATOR GAUGE

Application filed October 3, 1928. Serial No. 309,985.

This invention relates to indicator gauges, designed for use in connection with grinding machines, lathes and other machineshop appliances, and has for its object to provide novel automatic mechanism for gauging diameters, and the surfaces of work generally, whether or not the work is in motion. A further object is to provide a sensitive limit gauge that may be mounted for travel with a grinding or cutting member, or may be rigidly fixed in any desired position and accurately and automatically gauge and indicate finish and other measurements. A further object is to provide a mechanism which is especially adapted for gauging the turning or grinding of cylindrical bodies, the said mechanism being so arranged that the primary gauging member frictionally engages the cylinder diametrically opposite the point where the cutting or grinding is being effected, so that the measurements, which may be indicated by a needle, always relate to the true diameter of the work. By this adaptation of the present gauge, its indications will be reliable and accurate even in cases where one end of the work happens to be slightly lower than the other end, due to imperfect construction or improper adjustment of the work-supporting mechanism.

I attain these objects by the means set forth in the detailed description which follows, and as illustrated by the accompanying drawings, in which—

Figure 1 is a broken front elevation of a lathe or other work-supporting machine to which my gauge is applied. Fig. 2 is an end elevation of parts of the same. Fig. 3 is a broken front elevation of the gauge-indicator and related parts. Fig. 4 is a fragmentary view, showing the primary gauging member and an unground piece of work. Fig. 5 is a broken front view of the indicator. Fig. 6 is a central vertical section, taken on line 6—6 of Fig. 5, and an elevation of the guide that supports the gauging parts. Fig. 7 is respectively a front and a side elevation of the indicator needle. And Fig. 8 is respectively a front and a side view of the primary gauging member.

In the drawings, referring to Fig. 1, 2 represents conventionally a machine for supporting and operating cylindrical work, while the latter is being ground, comprising a frame 2′, a stationary head 2a having a center 2b, a movable tail-piece 2c having an alining center 2d, and a pulley-and-belt drive 2e, by which the work is rotated. 4 represents an abrading or grinding wheel, the mounting and driving parts thereof being omitted. The head 2a and tail-piece 2c are shown mounted upon a horizontal bed 2f, which with the work may be moved longitudinally relatively to the wheel. In Fig. 2 the wheel 4 is mounted upon a shaft 4′, which is supported by bearing-lugs 4a, that rise from a base 4b. During the grinding operations, the work, as 3, and the wheel 4 are rotated simultaneously in opposite directions, as indicated by the arrows in Fig. 2.

The indicator gauge and related parts are shown supported by a bracket 5, which may be detachably mounted upon the base 4b. In practice, there are two of the brackets 5, which are preferably spaced apart and connected by a square rod 5′, and facilitate suitable adjustment of the gauge in the direction of the axis of the work. The spacing of the brackets (not shown), may be varied according to the character of the work and the construction of the grinding machine.

The indicator gauge is supported by a beam or arm having an elongated square body 6, that is slidable horizontally in a square transverse opening 6′ of a block 6a, the said block also being formed with a longitudinal opening that slidably receives the rod 5′. A set-screw 5c holds the beam rigidly in the various adjusted positions. One end of the beam 6 is formed with a cross-head 6c, which in turn is formed with parallel vertical ways or openings 6d—6e.

The indicator comprises a circular casing 7, the front side of which is open and usually closed by a transparent disc 7′, which is held in place by an annular cap 7a. Beyond the disc 7′ is located a dial 7b, supported by an annular ledge, and bears graduations representing exaggerated thousandths of an inch, the dial being swept by a needle 8, by which various gaugings are indicated. The needle is oscillated by a train of gears, as 9, 10 and 12, which are mounted upon shafts 9' and 10' that have their bearings in the dial 7b and the rear wall, as 7c, of the casing. The gears are driven by an indicator operating rod or bar 13 which reciprocates in a vertical way 7d that alines with the way 6d of the beam, said rod being formed near its top end with a rack-portion 13', that drives the pinion 12 and gear 10 which operate as one part, and gear 10 drives the pinion 9. The casing 7 has a depending inverted T-shaped base 7e, which is detachably mounted upon a head 14 by screws 14'. The way 7d extends through the base 7e, and the head 14 is formed with an alining way 14a that connects the ways 6d—7d. The rod 13 extends a considerable distance below the head 6c and reciprocates in the last named ways. 15 represents a square guide whose upper end is seated in an opening 14b of the head 14 and is held in place by a pin 14c. This guide extends downwardly through the head 6c of the beam and is slidable in the way 6e. During the gauging operations, the head 14 rests upon the head 6c and supports the indicator and related parts by gravity. The lower end of the guide 15 is formed with a tongue 15a, which is perforated for pivotally mounting the primary gauging member 16. The member 16 is virtually a bell-crank and comprises a forked body portion 16' that receives the tongue 15a, a horizontal arm or ledge 16a that supports the lower round end of the rod 13, and a vertical arm 16c whose outer face is normally disposed in the plane of the corresponding face of the guide 15 and makes tangential contact with the work, preferably diametrically opposite the point where the abrading wheel 4 engages the work (see Figs. 2 and 4). By this arrangement, the arm 16c is always spaced from the wheel 4 the extent of the diameter of the work, and when the needle and member 16 are properly adjusted to a master-piece, as 3, in Fig. 2, at the start of a period of reproduction work, the indications at the dial 7b will denote the true diameter of the master-piece or accurately measured variations of said diameter.

The needle 8 projects radially from the base of a cylindrical body 8', which is bored out to receive a head 9a of the shaft 9', upon which the body may be rotated for adjusting the needle. The closed end of the body 8' is formed with a reduced portion 8a that extends through and has its bearing in the glass disc 7'. The neck 8a is bored out axially to receive the stem of a knob 8b, which is made rigid to the body by a pin 8c. The walls of the body 8' are slitted, as indicated at 8d in Fig. 7, to enable the body to expand and grip the head 9a with sufficient tension for effecting the ordinary gauging indications.

The guide 15 together with the superposed indicator, may be moved upwardly to enable the operator to apply and remove the work 3, and the said parts may be held in the elevated position by means of a spring 15b, which depends from the head 6c and is arranged to engage a stud 15c carried by the guide, as may be understood by referring to Fig. 2.

The operation of my gauge is as follows: Assuming that the brackets 5 are already in place, as in Fig. 2, the operator first places the master-piece 3 between the centers 2b—2d, as shown in Fig. 1. The beam 6 is then inserted loosely in the block 6a and the guide 15 inserted downwardly in the head 6c of the beam. The operator next moves the gauge parts, by sliding the beam 6 in the block 6a, until the finger 16c of the member 16 engages the work (see Fig. 2), and finally tightens up the set-screw 5c for holding the gauge-supporting mechanism rigid. The operator next looks at the dial and notes the position of the needle relatively to the zero mark. If the needle points to zero, it needs no adjustment. But in case the needle happens to be deflected in either direction from zero, the operator grasps the knob 8b and swings the pointer back to zero. This completes the setting of the gauge. The next step consists of raising the movable gauge parts, as described, for removing the master-piece 3 and applying the unground piece, as 3', as shown in Fig. 4, after which the gauge mechanism is again lowered ready to begin the grinding, as shown in Figs. 1 and 2. The unfinished work 3' being of greater diameter than the master-piece 3, causes the tilting of the member 16, which disposes the arm 16c at an angle to the guide 15, as shown in Fig. 4. This tilting of member 16 lifts the rod 13, which rotates the gears 9, 10 and 12 and deflects the needle towards the left of the zero mark, as shown in Fig. 7. This deflection of the pointer indicates how much must be ground away in order to bring the work 3' to the exact diameter of the master-piece 3. As the grinding of the piece 3' progresses, the member 16 is rocked in the opposite direction by the gravitation of the rod 13, until the needle again points to zero, and the gauging surface of the finger 16c coincides with the plane 15d of the guide 15. By mounting the gauge mechanism as herein shown and described, wherein the member 16 is positioned diametrically opposite the abrading point, and by providing the relatively long plane gauging surface, as 16x, which is disposed tangentially relatively to the circumference of the work and grinding wheel, insures greater accuracy and refinement of the gauging, than is possible by any other disposition of the primary gauging member. The gravitation of the rod 13 may be assisted by means of a spring 13c, which is disposed near the top end of the way 7d, shown in Fig. 6.

Having thus described my invention, what I claim, is—

1. An indicator gauge for measuring cylindrical work, including a graduated dial, a needle to traverse the dial, a train of gears to oscillate said needle, a gravitative rack-bar having gear engaging teeth rigid thereon for driving the gears, a guide for supporting the gauge mechanism, a beam for supporting said guide, said beam being adjustable for moving the guide towards and away from a grinding member employed for reducing the work to a predetermined size, and a primary gauging member pivotally supported by the guide adapted to engage the work tangentially opposite the point where the grinding is effected.

2. A gauge for measuring work being ground, including an elongated vertically disposed support, an indicator carried by the support, a vertically movable member carried by the support, means operable by said member to actuate the indicator, and a substantially L-shaped gauging member pivoted at its angle to the lower end of said support and having one arm thereof forming a rest on which the lower end of said member engages and having its other arm formed to engage the work at a point diametrically opposite to the point of grinding thereof.

3. A gauge for measuring work being ground, including an elongated vertically disposed support, an indicator carried by the support, a vertically movable member carried by the support, means operable by said member to actuate the indicator, and a gauging member movably carried by the lower end of the support for operating the member and having a part formed to engage the work at a point diametrically opposite to the point of grinding thereof.

4. A gauge for measuring work being ground including a horizontal rod, means to support the rod in a plane above the work, a block slidable on the rod, and having an opening therein transverse to the rod, a horizontal beam adjustable in said opening of the block, an elongated vertically disposed guide secured to the beam and depending therefrom, an indicator carried by the guide, a vertically movable member carried by the guide, means operable by the member to actuate the indicator, and a substantially L-shaped gauging member pivoted at its angle to the lower end of the guide and having one arm thereof forming a rest on which the lower end of the member engages and having its other arm formed to engage the work at a point diametrically opposite to the point of grinding.

5. A gauge for measuring work being ground including an elongated vertically disposed guide, an indicator carried by the guide, a vertically movable member carried by the guide, means operable by the member to actuate the indicator, means pivoted to the lower end of the guide and having a part forming a rest on which the lower end of the member engages and having a second part formed to engage the work, means for supporting the guide in its vertical position, and means to support said adjusting means for horizontal adjustments toward and away from the work.

In testimony whereof I affix my signature.

LINO SCUSA.